United States Patent
Jones (10) Patent No.: US 8,321,655 B2
(45) Date of Patent: *Nov. 27, 2012

(54) EXECUTION PARALLELISM IN EXTENSIBLE FIRMWARE INTERFACE COMPLIANT SYSTEMS

(75) Inventor: Stephen E. Jones, Bellevue, WA (US)

(73) Assignee: Phoenix Technologies Ltd., Milpitas, CA (US)

(*) Notice: Subject to any disclaimer, the term of this patent is extended or adjusted under 35 U.S.C. 154(b) by 464 days.

This patent is subject to a terminal disclaimer.

(21) Appl. No.: 12/566,584

(22) Filed: Sep. 24, 2009

(65) Prior Publication Data

US 2010/0318776 A1    Dec. 16, 2010

Related U.S. Application Data (60) Provisional application No. 61/268,562, filed on Jun. 13, 2009.

(51) Int. Cl.
*G06F 9/24* (2006.01)
*G06F 15/177* (2006.01)

(52) U.S. Cl. .............................................. 713/1; 713/2
(58) Field of Classification Search .................... 713/1, 2
See application file for complete search history.

(56) References Cited

U.S. PATENT DOCUMENTS

| | | | |
|---|---|---|---|
| 6,732,264 B1 * | 5/2004 | Sun et al. ........................... | 713/2 |
| 7,234,054 B2 | 6/2007 | Rothman et al. | |
| 2005/0210222 A1 | 9/2005 | Liu et al. | |
| 2006/0047941 A1 * | 3/2006 | Lai ..................................... | 713/2 |
| 2008/0028200 A1 | 1/2008 | Polyudov | |
| 2009/0319763 A1 * | 12/2009 | Zimmer et al. ................... | 713/1 |

OTHER PUBLICATIONS

Oram, Issac, Mobile Platform Usage of UEFI and the Framework Technology, date unknown, 54 pages.
Li, Kevin, "Intel Framework Customization for Optimized Platform Boot Initialization", date unknown, 13 pages.
Berlin et al., "Pathway to the Future, PC Client Revolutionary Embedded Software", date unknown, 32 pages.

* cited by examiner

*Primary Examiner* — Vincent Tran
(74) *Attorney, Agent, or Firm* — Brokaw Patent Law PC; Christopher J. Brokaw (57) ABSTRACT

Methods, systems, apparatuses and program products are disclosed for providing execution parallelism during the DXE phase of computer start-up.
Provision is made for loading a microkernel (or other kernel program) which presents itself as though it were a DXE Driver and changes a single threaded environment into multithreaded. This is while the supervisor program continues its role as loader/initiator but remains unaware that it no longer has overarching control of Driver scheduling (which has been acquired by Kernel).

16 Claims, 6 Drawing Sheets

FIG. 1

| | |
|---|---|
| SEC 202 | Security<br><br>Pre-verifier |
| PEI 204 | Pre-EFI initialization<br><br>Includes CPU clock mode, chipset, board initialization, RAM hardware level configuration. |
| DXE 206 | Driver Execution Environment<br><br>Includes EFI Driver Dispatcher, intrinsic services, Device, Bus and Service DXE Drivers |
| BDS 208 | Boot Device Selection<br><br>Includes Boot Manager, GRUB |
| TSL 210 | Transient System Load<br><br>Includes loading and initializing O/S |
| RT 212 | Run Time<br><br>Includes final O/S environment and O/S based applications programs |
| AL 214 | After Life<br><br>Includes support for shutdown or hibernate procedures |

EXECUTION PARALLELISM IN EXTENSIBLE FIRMWARE INTERFACE COMPLIANT SYSTEMS

RELATED APPLICATIONS

This application claims priority to U.S. Provisional application for a patent No. 61/268,562 entitled INNOVATIONS IN SECURECORE TIANO 2.0 filed Jun. 13, 2009 inventor Stephen E. Jones and which is incorporated in its entirety by this reference.

FIELD OF THE INVENTION

The present invention generally relates to personal computers and devices sharing similar architectures and, more particularly relates to a system and corresponding method for execution parallelism in a DXE (Driver Execution Environment) phase of a PC (personal computer) startup process. Similar processes within comparable computing apparatuses or within a single computer operational session or context also fall within the general scope of the invention.

BACKGROUND OF THE INVENTION

Modernly, the use of PCs (personal computers), including so-called laptop and notebook computers, is increasingly common and the computers themselves are ever more powerful and complex. A persistent problem is the unduly long elapsed time between the moment of power-on and the time when the PC has become ready for user stimulus and/or to initiate useful work.

Intel Corporation first defined EFI (Extensible Firmware Interface) as the programming interface exposed by firmware to O/S (operating system); former comparable firmwares were not sufficiently portable or scalable to Intel's CPU (Central Processor Unit) IA64 architecture. A first implementation of the EFI interface became known as Tiano, which Intel® Corporation offered under license via a web site. The UEFI Forum (Unified EFI Forum), a trade group, secured architectural control over EFI (and derivatives thereof) under a new name—UEFI, with a right to support and extend. The UEFI Forum documents and specifies the UEFI interface.

The PIWG (Platform Initialization Working Group) of the UEFI Forum provides a common internal framework for Silicon and platform drivers, so that a common understanding of the roles and methods used by Silicon and platform drivers is developed by implementers of UEFI firmware stacks together with the providers of the Silicon and platform drivers.

The UEFI and related standards provide richness, but fail to sufficiently address significant specific areas of concern including:

Quality of board bring-up user experience
Quality of BIOS customization experience
Duration of system bootloading and platform initialization time
Level of reliability
Level of compatibility with Intel's Foundation Core (also known as Foundation for short and a part of Tiano)
Scope for platform innovation by BIOS (basic input-output system) vendors and partners and customers thereof.

These attributes are described in the 2009 version of SCT (SecureCore Tiano™) System Overview published by Phoenix® Technologies Ltd . . . . Adequately addressing all of these areas of concern requires innovation above and beyond what is described in UEFI and PIWG standards. However, innovation needs to be at least backwards compatible with those same standards so as not to lose benefits of compliance therewith.

The EFI/UEFI environments provide for DXE (Driver Execution Environment) firmware running in a limited execution environment with a fixed control policy. A sole means of communication between drivers is the so-called Protocol, a means for drivers to publish pointers to internal routines and data so that other drivers may call and exploit them. Drivers, also known as device drivers are well-known in the computing arts. Although running in protected mode, with 32-bit or 64-bit addressability, the DXE environment implements drivers as connected islands of functional capabilities.

This environment relies on dependency expressions of protocols exposed by DXE drivers, and upon a schedule of DXE drivers to be loaded in a desirable order. Once loaded, DXE drivers are run once, publishing protocols as necessary, so that they might be called again only when their services are requested through published protocols. Limited services are provided by the Foundation for a DXE Driver to gain control on a timer tick, as well as being notified when an O/S loads or has finished loading. Functionality is thereby limited, perhaps unduly limited in view of the specific areas of concern previously mentioned. UEFI lacks a structural framework for execution that is sufficiently flexibly adaptable to problems presented in practical embodiments.

However, UEFI Specification(s) offer considerable richness by making it possible to combine drivers together into stacks in many different ways to form new compound capabilities. In this way UEFI compliant products may contemplate taking on a large problem space for the future.

While UEFI's protocols are well-defined, the execution vehicles providing support for drivers that implement these protocols in the native EFI environment is relatively primitive. There exists a need to provide a more pragmatic extension of the Foundation that provides modern programming paradigms while remaining compatible with existing EFI/UEFI practice and especially with unmodified drivers for a smooth transition to exploitation of the improved capabilities.

A significant advantage of embodiments of the present invention over previously developed solutions is that it becomes possible to make improvements by implementing execution parallelism and/or associated time-sharing within a DXE phase of computer loading and initialization.

SUMMARY OF THE INVENTION

The present invention provides a method for operating a computer and also an apparatus that embodies the method. In addition program products and other means for exploiting the invention are presented.

According to an aspect of the present invention an embodiment of the invention may provide a method for providing execution parallelism during the DXE and even BDS (Boot Device Selection) phases of computer start-up. This may include loading and initializing a computer comprising executing an EFI-style Foundation, loading a Kernel that has a thread creation and supervision capability, creating an ISR (interrupt service routine) to hook a timer interrupt and reentering the EFI core program as a first thread supervised by the kernel. Kernels are well-known in the computing arts and refer to a central part of a software, firmware or microcode implementation and which have far reaching control at run time. Microkernels are also well-known; they have components that run at mutually differing privilege levels, interrupt levels or some such scheme.

Further provided for may be the loading of DXE Driver programs that create threads and block themselves without blocking an underlying DXE Foundation program.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and wherein like numerals represent like elements, and in which.

DETAILED DESCRIPTION OF THE INVENTION

The numerous components shown in the drawings are presented to provide a person of ordinary skill in the art a thorough, enabling disclosure of the present invention. The description of well known components is not included within this description so as not to obscure the disclosure or take away or otherwise reduce the novelty of the present invention and the main benefits provided thereby.

Embodiments of the disclosure presented herein provide methods, systems, apparatus, and computer-readable media for providing and utilizing a means for time saving parallel execution capability in a context of PC startup and initialization. In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

Figure 1:
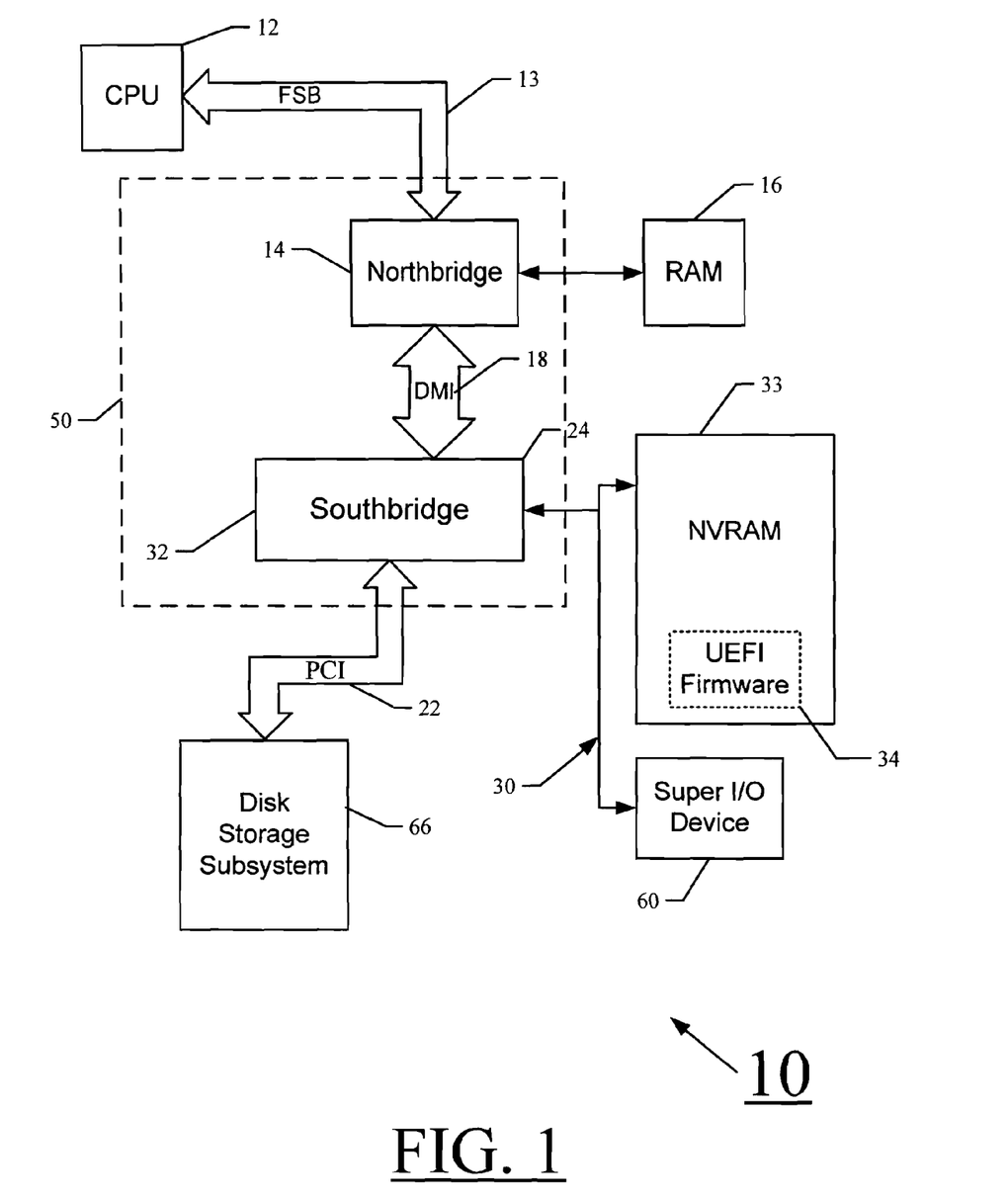
FIG. 1 is a schematic block diagram of an electronic device configured to implement the present invention.

An exemplary embodiment of the present invention will now be described with reference to the figures. FIG. 1 is a schematic block diagram of an electronic device configured to implement the operational functionality according to the present invention.

FIG. 1 shows a computer 10 that is operative to provide an EFI/UEFI firmware environment to provide a DXE phase and that facilitates execution parallelism during the DXE phase and even beyond such as into the BDS phase. The computer 10 typically includes a baseboard, or motherboard form of printed circuit board to which a multitude of components or devices are connected by way of a system bus or other electrical communication path. In one illustrative embodiment, a CPU (central processing unit) 12 operates in conjunction with a chipset 50. The CPU 12 is a standard central processor that performs arithmetic and logical operations necessary for the operation of the computer.

Chipset 50 may include a Northbridge 14 and a Southbridge 32. The Northbridge 14 may be attached to CPU 12 by a FSB (Front Side Bus) 13 and typically provides an interface between the CPU 12 and the remainder of the computer 10. The Northbridge 14 may also provide an interface to a RAM (random access memory) 16 the main memory for the computer 10 and, possibly, to other devices such as an on-board graphics adapter (not shown in FIG. 1).

The Northbridge 14 is connected to a Southbridge 32 by a DMI (direct media interface) 18. The Southbridge 32 may be responsible for controlling many of the input/output functions of the computer 10 such as USB (universal serial bus), sound adapters, Ethernet controllers and one or more GPIO (general purpose input/output) port (None shown in FIG. 1). In one embodiment, a bus comprises a PCI (peripheral component interconnect) bus circuit 22 to which a disk storage subsystem 66 (often abbreviated to "disk") or other storage devices for storing an operating system and application programs may be attached.

The Southbridge 32 may also provide SMM (system management mode) circuits and power management circuitry. A peripheral interface 30 may also be provided by the Southbridge 32 for connecting a SuperI/O (Super input-output) device 60.

As known to those skilled in the art, an O/S (operating system) such as may be stored on disk 66 comprises a set of programs that control operations of a computer and allocation of resources. An application program is software that runs on top of the O/S software and uses computer resources made available through the O/S to perform application specific tasks desired by the user.

Disk 66 may also provide non-volatile storage for the computer 10. Although the description of computer-readable media contained herein refers to a mass storage device, such as a hard disk or CD-ROM drive, it should be appreciated by those skilled in the art that computer-readable media can be any available media that can be accessed by the computer 10. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, serial EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

The peripheral interface 30 may also connect a computer storage media such as a ROM (Read-only memory, not shown) or, more typically, a flash memory such as a NVRAM (non-volatile random access semiconductor memory) 33 for storing UEFI platform firmware 34 that includes program code containing the basic routines that help to start up the computer 10 and to transfer information between elements within the computer 10. The UEFI firmware 34 is compatible with the UEFI Specification.

It should be appreciated that the computer 10 may comprise other types of computing devices, including hand-held computers, embedded computer systems, personal digital assistants, and other types of computing devices known to those skilled in the art. It is also contemplated that the computer 10 may not include all of the components shown in FIG. 1, may include other components that are not explicitly shown in FIG. 1, or may utilize an architecture different from that shown in FIG. 1.

Figure 2:
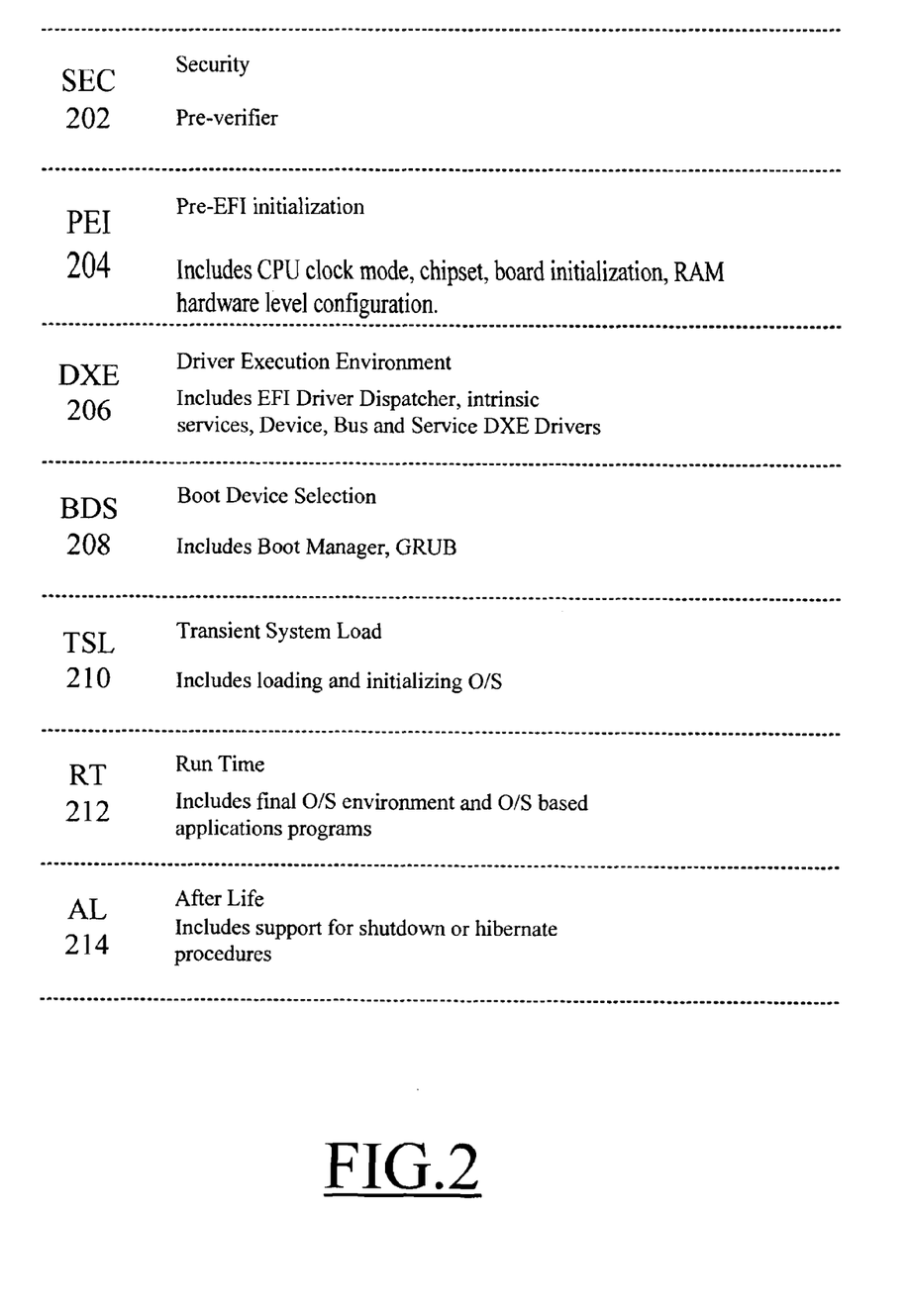
FIG. 2 shows an event sequence diagram according to an embodiment of the present invention.

FIG. 2 shows an event sequence diagram to illustrate an embodiment of operations performed by a computer system initializing in an EFI/UEFI conforming manner, that is following the EFI/UEFI Framework and according to an embodiment of the invention. Details regarding the operation and architecture of EFI/UEFI can be found in the appropriate previously developed and published documentation.

The process is divided into several phases, including a SEC (Security) phase 202, a PEI (Pre-EFI Initialization) phase 204, a DXE (Driver Execution Environment) phase 206, a BDS (Boot Device Selection) phase 208, a TSL (Transient System Load) phase 210, an O/S RT (Run-Time) phase 212, and an AL (After-Life) phase 214. The phases progressively provide a run-time environment for the PC applications.

The SEC phase 202 supports security checks from power-on initiation and authenticates the Foundation as a requirement prior to safely executing it.

The PEI phase 204 provides a standardized method of loading and invoking specific initial configuration routines for the processor, chipset, and motherboard. This phase initializes sufficient system to provide a stable base for continuing. Initialization of core components including CPU, chipset and main motherboard occurs. The PEI phase locates and configures memory and hands it off to the DXE phase immediately following.

The DXE phase 206 is where much of the implementation of embodiments of the invention is to be found. This is the phase during which most of the system initialization is performed. The DXE phase 206 uses a DXE Core, a DXE Dispatcher (also known as the Driver Dispatcher) and a plurality of DXE Driver programs. The DXE Core provides Boot Services, Runtime Services, and DXE Services. The Driver Dispatcher discovers, loads and initiates DXE Drivers according to a pre-defined sequence The DXE drivers initialize components and provide services (including software abstractions of some devices).

The BDS phase 208 further prepares the computer system to load an O/S. This may include such well known programs as GRUB (Grand Unified Bootloader)

The TSL phase 210 facilitates services to be available to an O/S loader. The RT (Run Time) phase 212 is largely software, rather than firmware, controlled and includes application programs. EFI Runtime services reemerge in the AL (After Life) phase 214 in connection with winding-up operations.

Figure 3:
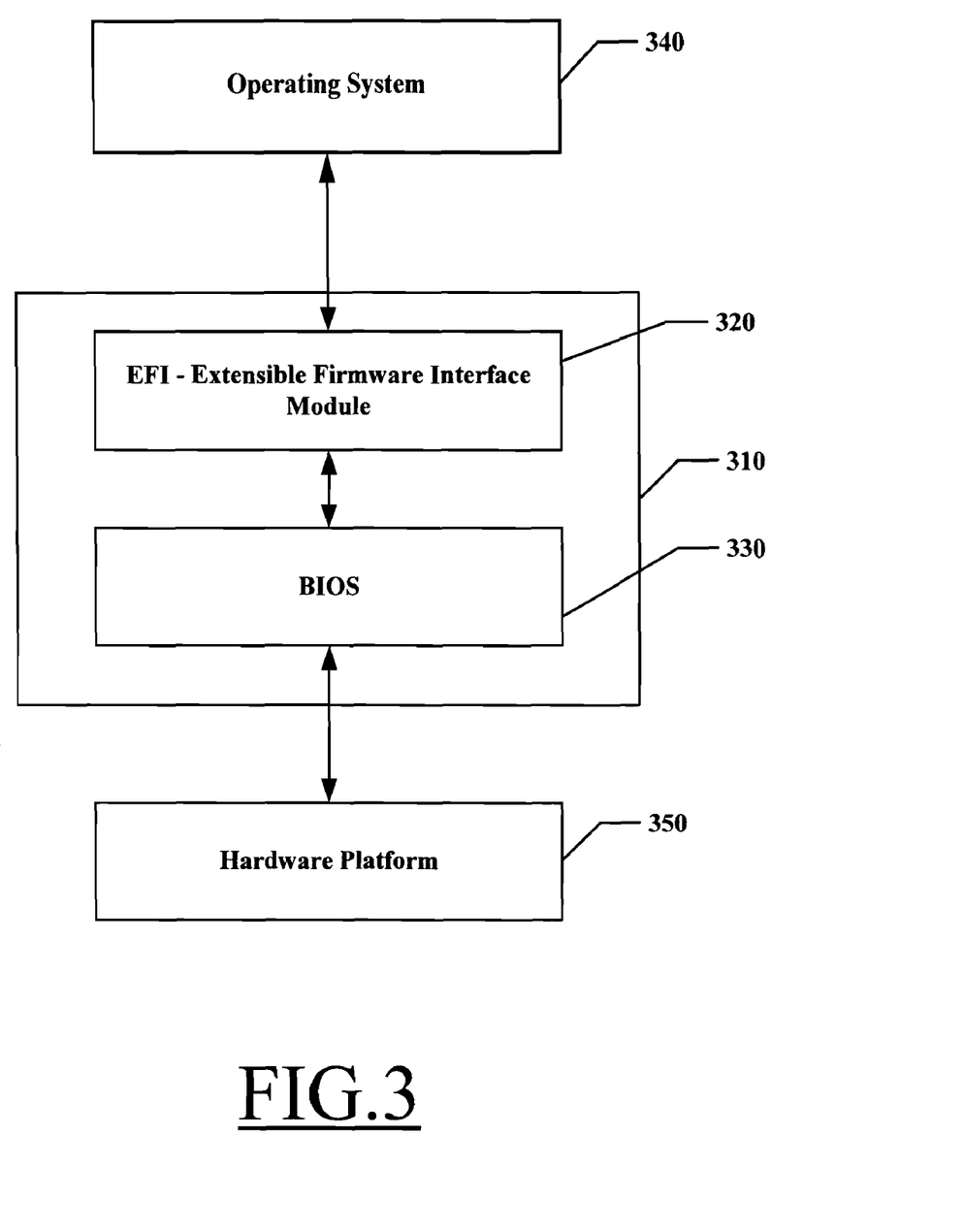
FIG. 3 shows relationships between major hardware, firmware and software components according to an embodiment of the invention.

FIG. 3 shows relationships between major hardware, firmware and software components according to an embodiment of the invention. Referring to FIG. 3, platform firmware 310 comprises one or more modules 320 compliant the EFI Specification (Extensible Firmware Interface from Intel Corporation) or UEFI (Unified EFI) Specification (from the UEFI Forum—a trade organization). EFI and UEFI specifications describe an interface between O/S (Operating System) 340 and the platform firmware 310. EFI and UEFI specifications also describe the interface platform firmware 310 implements in support of bootloading interface used by O/S 340.

Platform firmwares are implemented in various ways within compliance with EFI and UEFI specifications and also include a BIOS 330 that provides a level of support for access to Hardware Platform 350. Hardware Platform 350 can itself come in multiple guises including hardware per se, as well as supporting microcoded engines and the like.

Embodiments of the invention provide a new Kernel architecture at the bottom of an execution stack that can expose new execution and communication vehicles. Also a PE32+ loader that supports dynamic linking, and augments the Foundation Core's loader services in a way that does not modify the Foundation itself is present. PE32+ program formats and loaders for such are well-known in the art. System policies may be implemented, including configuration, security, and boot policies. Execution context vehicles allow DXE drivers to load in a legacy (previously developed EFI DXE) context, in an SMM context, and in a virtual machine, or even in other contexts still to be anticipated.

One such other context may be the STM (SMM Transfer Monitor) feature which essentially provides for virtualization (or similar) of code which might otherwise be expected to operate in SMM (or at least is designed or compatible thereto). Alternatively (arguably equivalently) one may regard STM as a form of hypervisor that virtualizes the CPU's SMM itself. STM can be considered as a not yet mature technology and implementation details of it may evolve.

A provided DXE phase innovation of particular interest is the provision of Execution Parallelism through incorporation of a microkernel (though a monolithic Kernel could also be used within the general scope of the invention). Microkernels provide functionality through their KPI (kernel program interface), in the form of functions callable by DXE drivers and UEFI applications. A microkernel may support elemental objects providing execution vehicles, including threads, timers, interrupts, DPCs (deferred procedure calls), power-fail notifications, and power resume notifications.

In embodiments of the invention threads are a central feature of execution parallelism. Kernel threads are in general well-known in the art of O/Ses but have not heretofore been applied in the present non-obvious implementations. Threads are used in the inventive UEFI DXE and/or BDS phase environment(s) to provide parallelism, boosting performance such as by simplifying expression of solutions from state machines to threaded designs.

In previously developed EFI/UEFI environments, DXE drivers receive control once they are loaded, and do not subsequently execute until they are called via an exposed protocol. This requires them to perform initialization of their managed controller, bus, or device either at initialization time or at the time a connect request is made through a protocol. Because device initialization often involves polling for devices and waiting for them to become ready (e.g. hard drive spin-up, or keyboard startup) these, or other, delays are serialized resulting in undue delays and hence overly large boot times.

In embodiments of the invention DXE Drivers may allocate threads by calling a Kernel function, for example by passing as a parameter a pointer to the driver function to be executed in parallel by the new thread. Execution may thus continue in parallel on a thread context even while the driver initialization routine returns control to the DXE Foundation program.

Inside thread functions, other Kernel services may be called, as can EFI services, including EFI Boot Services and so-called EFI Run Time Services.

To achieve even greater parallelism, a driver may create a thread for each logical or physical device it manages. Additional threads may be allocated to perform periodic cleanup tasks, or health measurement, thus offering new benefits.

Threads may be provided inside all or many execution contexts, in the native DXE environment, an SMM environment, and/or virtualized environments, thus allowing comparable programming paradigms to be adapted across implemented contextual modes.

Kernel may also offer a lightweight mechanism for scheduling execution of a function at a future point in time with dynamic granularity, supported across all execution contexts and based on provision of timer service(s).

In previously developed solutions, DXE drivers typically use an Event Boot Service to schedule the execution of a function on a timer tick. However, this method does not scale well such as across SMM and/or virtualized environments. By implementing the more native timer object across all contexts, and exposing respective kernel services to DXE drivers and to Executive programs, the Kernel is able to provide uniform dispatching of deadline-based execution in the system. Also, provided timer services may be parameterized as to duration and so provide dynamic granularity that is not sufficiently available in the Event Boot timer tick service.

Moreover, the Kernel may be configured to use the Foundation's Event services to provide the source of control for dispatching its timers and threads, or the Kernel may be configured to implement a virtualized Event service using the Kernel's more lightweight services, by hooking the DXE phase Boot Services table. The latter may allow a Foundation's Event service to be supported across all execution contexts.

Interrupt objects may also be provided by Kernel thus offering an execution vehicle to respond to a hardware event, for example an interrupt generated by an APIC (Advanced Programmable Interrupt Controller), a SMI (System Management Interrupt) generated by the system's own chipset when a non-interrupting hardware event occurs, or through virtualization traps of I/O (input/output) or memory space.

Without Kernel capabilities, interrupts other than the Event timer tick might not be supportable in DXE Drivers; however, interrupts are needed in order to receive notice of events happening in physical worlds, including during POST (Power-On Self Test), during O/S load, after O/S load, or even when O/S fails.

Thus, in embodiments of the present invention, with interrupts supported by the Kernel, DXE drivers have not need to make resource-consuming (and time-wasting) polls for devices to complete their I/O This allows those CPU cycles to be used more productively than heretofore thus resulting in accelerated boot times.

Figure 4A:
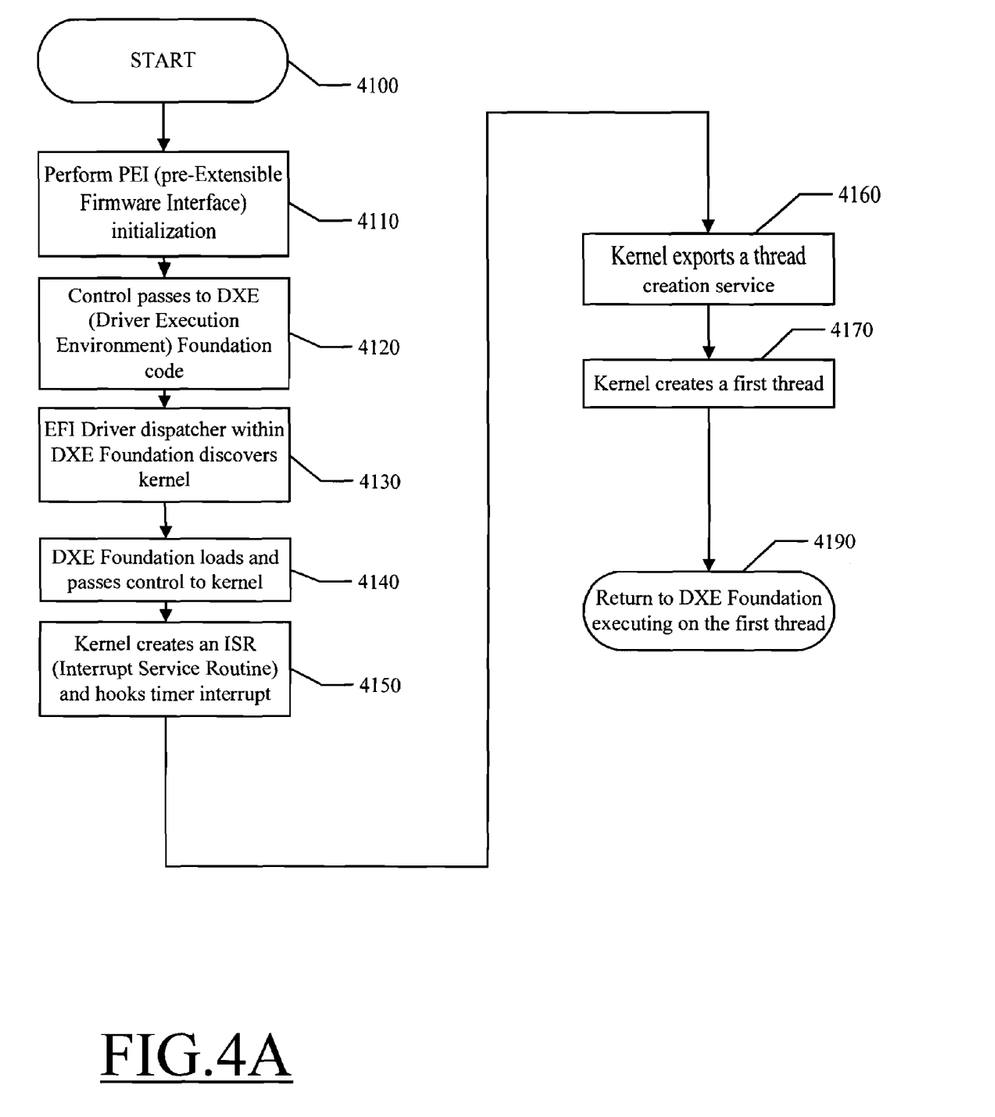
FIG. 4A show a sequence of acts in which part of an embodiment of the invention is depicted of an embodiment of the invention.

Referring to FIG. 4A, a sequence of acts in which part of an embodiment of the invention is depicted as starting at Ref. 4100, in a context of an EFI or UEFI compliant PC startup sequence having completed the first phase of startup from power-on (the SEC or Security phase).

At Ref. 4110, the pre-EFI phase is performed. This phase tends to be quite hardware specific and related to the type of controller and memory chips available. Both cache and main memory must be configured in and main memory is not available for general purpose use at the start of the pre-EFI phase, but becomes available at some point. Thus rather specialized techniques have evolved, for example chips which will eventually be configured as cache memory may initially be used as main memory while the main memory chips themselves are probed and configured into place.

At Ref. 4120, control passes to the DXE (Driver execution environment) Foundation code which is highly standardized and operates as described earlier in the present document. By design the DXE Foundation code is intended to single thread through the loadable DXE Drivers, however according to an embodiment of the invention this behavior is modified as described below.

At Ref. 4130, the EFI Driver dispatcher (which is part of the EFI or UEFI Foundation program and commonly known in context as "Dispatcher" or "dispatcher" for short) discovers the Kernel program and at Ref. 4140 loads it into main memory and passes control to it. By design, the dispatcher searches for and discovers DXE drivers so the Kernel program is presented as appearing (to the dispatcher) to be a first DXE Driver. Loosely speaking one might say the Kernel is disguised to look like a DXE Driver program. Typically, though not essentially, Kernel will be loaded from (having been previously stored in) stored in NVRAM rather than hard disk since it is rather fixed for the platform and typically has an intimate relationship with (other) parts of BIOS. In an alternative embodiment within the general scope of the invention, it is possible for Kernel to be executed directly out of a ROM; however there are well-known disadvantages to such an approach even though it is substantially compatible and/or equivalent.

At Ref. 4150, Kernel attaches itself to a hardware timer interrupt. The usual technique, well known in the art, for doing this is to create an ISR (Interrupt Service Routine) and patch into (also known as hook) the appropriate interrupt vector. EFI/UEFI Foundation code expressly permits DXE Drivers to hook the timer in this way, and indeed it is to be expected that in previously developed solutions, one or more DXE Drivers would do exactly that.

Kernel may create, and at Ref. 4160, Kernel exports (makes available) at least one (typically precisely one) thread-creation service. This service will be used later by actual DXE Drivers as described below. Methods for exporting services including inter-process calls are well known in the art.

At Ref. 4170, Kernel uses its own thread creation code to create the first thread, and since it retains execution context it can now be considered to be running on its own first thread. This running on the first thread is to be distinguished from running in the newly created ISR on an interrupt thread as will occur later after a hardware timer has been triggered.

At Ref. 4190, control is returned (by exiting) to the Driver Dispatcher that called Kernel, however instead of being single threaded, execution is now embodied as a thread supervised by Kernel (though until other DXE Drivers create more thread the distinction between running in a single threaded environment and running as the sole thread in a potentially multi-threaded environment is but a fine distinction). With execution now out of Kernel and back in Foundation, the end of FIG. 4A is reached and control passes to the entry point into FIG. 4B.

Figure 4B:
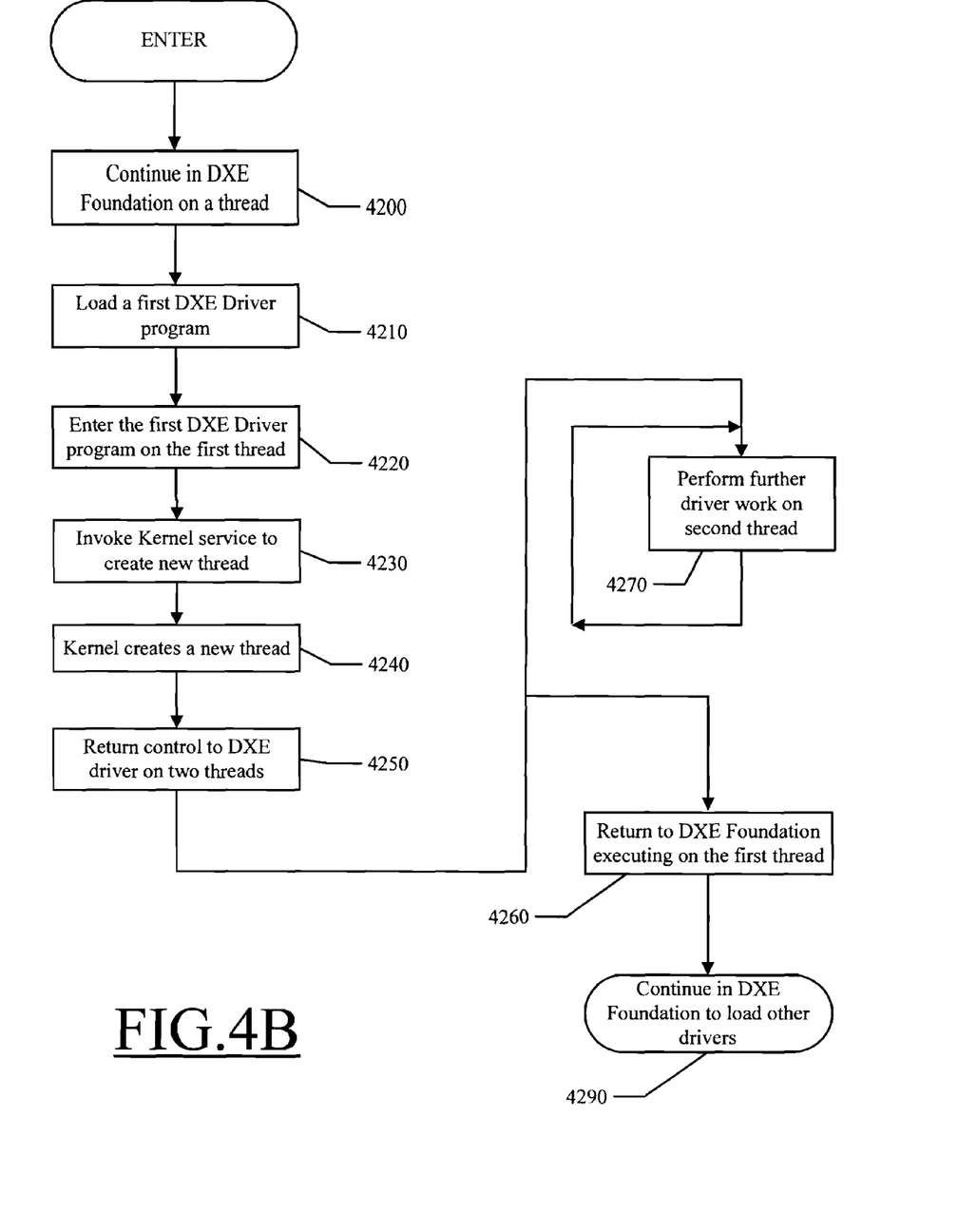
FIG. 4B is a continuation of the acts described in connection with FIG. 4A.

Referring to FIG. 4B, which may be regarded as a continuation of the acts described in connection with FIG. 4A, the process continues at Ref. 4200 in the DXE Foundation code. At Ref. 4210, the first actual DXE Driver (excluding the Kernel program) is located by Dispatcher and loaded into memory. Then, at Ref. 4220 the DXE driver is entered; execution is still proceeding on the first thread.

At Ref. 4230 the DXE Driver program invokes the Kernel's service to create a new thread having located the service using the information the arose out of the Kernel exporting the service as described above in connection with at Ref. 4160 in the discussion of FIG. 4A. The thread may be configured to run in a separate VM (Virtual Machine) or even in a separate core of a multi-core processor according to expressed DXE Driver requirements.

At Ref. 4240 the Kernel creates the new thread, which is a second thread and initializes it. Kernel supervises time-sharing between the two threads. In an embodiment Kernel provides for thread switching based on switching context due to a thread blocking itself (such as waiting for a message or an event) or alternatively scheduling preemptively such as by switching at time of servicing the hooked timer interrupt. Techniques for threading, blocking etc. are well-known techniques implemented in many Kernel programs.

At Ref. 4250, control returns to the DXE Driver on two threads time-shared each with the other. At Ref. 4260 the DXE Driver may promptly return control to the DXE Foundation on the first (original) thread while in effective simultaneity (at Ref. 4270, and on a time-sharing basis) progressing on the second thread other work that may be time consuming. However, execution on the second thread may become blocked freeing time for use on the first thread and thus progressing the DXE phase of platform bring up through having thus facilitated parallel execution of the work. It will be apparent to persons of ordinary skill in the art that execution may continue (Ref. 4290) so that other DXE Drivers may be loaded and may create further threads thus providing still more parallelism in execution. In a large practical embodiment there may be dozens, if not hundreds, of DXE Drivers not all of which require their own threads.

As is well known in the art, threads may terminate themselves when their work is done, often first creating events to notify their completion to other cooperating entities. However such behaviors, though commonplace, are not to be seen as a critical feature of the invention.

Figure 5:
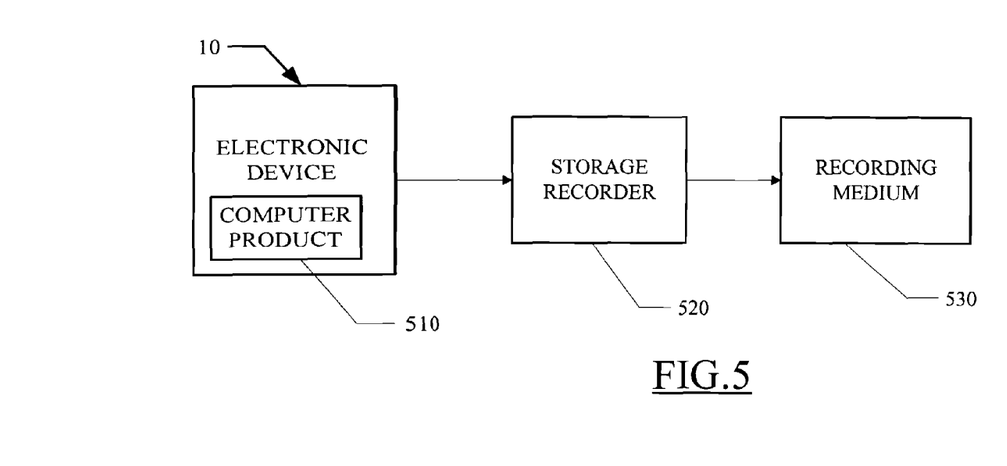
FIG. 5 shows how an exemplary embodiment of the invention may be encoded onto a computer medium or media.

With regards to FIG. 5, computer instructions to be incorporated into an electronic device 10 may be distributed as manufactured firmware and/or software computer products 510 using a variety of possible media 530 having the instructions recorded thereon such as by using a storage recorder 520. Often in products as complex as those that deploy the invention, more than one medium may be used, both in distribution and in manufacturing relevant product. Only one medium is shown in FIG. 5 for clarity but more than one medium may be used and a single computer product may be divided among a plurality of media.

Figure 6:
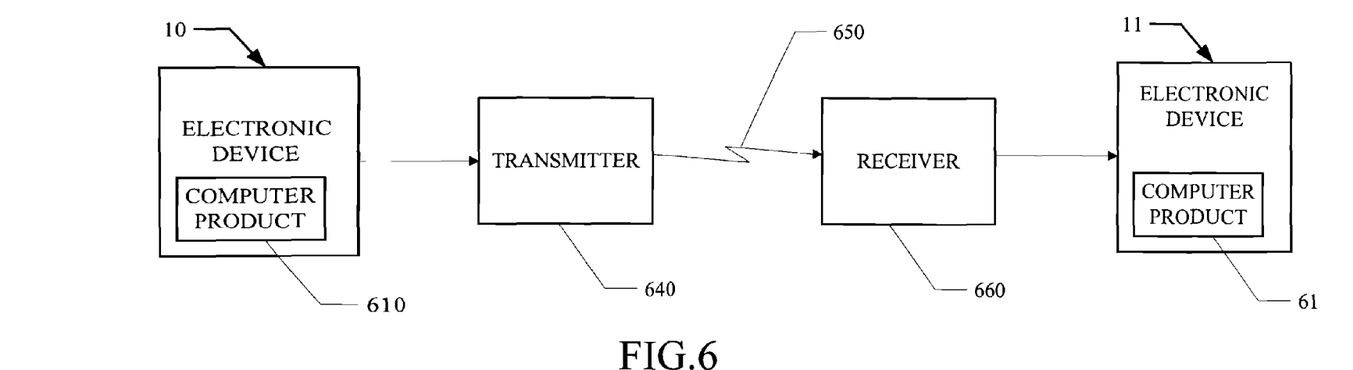
FIG. 6 shows how an exemplary embodiment of the invention may be encoded, transmitted, received and decoded using electro-magnetic waves.

FIG. 6 shows how an exemplary embodiment of the invention may be encoded, transmitted, received and decoded using electro-magnetic waves.

With regard to FIG. 6, additionally, and especially since the rise in Internet usage, computer products 610 may be distributed by encoding them into signals modulated as a wave. The resulting waveforms may then be transmitted by a transmitter 640, propagated as tangible modulated electro-magnetic carrier waves 650 and received by a receiver 660. Upon reception they may be demodulated and the signal decoded into a further version or copy of the computer product 611 in a memory or other storage device that is part of a second electronic device 11 and typically similar in nature to electronic device 10.

Other topologies and/or devices could also be used to construct alternative embodiments of the invention. The embodiments described above are exemplary rather than limiting and the bounds of the invention should be determined from the claims. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for loading and initializing a computer comprising:
    executing an EFI (extensible firmware interface) core program to load a kernel program into memory;
    executing the kernel program to create an ISR (interrupt service routine);
    reentering the EFI core program as a first thread supervised by the kernel;
    executing the EFI core program to load a driver program; and
    executing the driver program on the first thread to invoke a service provided by, the kernel to create and initialize a second thread supervised by the kernel and further to return control to the EFI core program,
    wherein the second thread is initiated to run in a SMM (system management mode) or a virtualized SMM (system management mode).

2. The method of claim 1 wherein:
the kernel is a microkernel.

3. The method of claim 1 wherein:
the ISR hooks a timer circuit interrupt.

4. The method of claim 1 wherein:
the second thread is initiated to run of a multi-processor core distinct from the multi-processor core in which the first thread runs.

5. The method of claim 1 wherein:
the kernel exports a service to provide a timer and the driver program invokes the service to provide a timer.

6. The method of claim 1 wherein:
the driver program is a DXE (Driver Execution Environment) program.

7. The method of claim 6 wherein:
the kernel exports a service to provide a timer and the DXE program invokes the service to provide a timer.

8. The method of claim 7 wherein:
the service to provide a timer provide dynamic granularity.

9. The method of claim 6 wherein:
the kernel exports a service to provide an interrupt service response to a hardware event.

10. The method of claim 6 wherein:
the kernel exports a service to provide an interrupt service response to a SMI (system management interrupt).

11. A non-transitory computer readable medium having stored thereon instructions for causing one or more processing units to execute a method, comprising:
    executing an EFI (extensible firmware interface) core program to load a kernel program into memory;
    executing the kernel program to create an ISR (interrupt service routine);
    reentering the EFI core program as a first thread supervised by the kernel;
    executing the EFI core program to load a driver program; and
    executing the driver program on the first thread to invoke a service provided by the kernel to create and initialize a second thread supervised by the kernel and further to return control to the EFI core program,
    wherein the second thread is initiated to run in a SMM (system management mode) or a virtualized SMM (system management mode).

12. The non-transitory computer readable medium of claim 11 wherein:
the EFI core program and the kernel program are loaded from one ROM (read-only memory).

13. An electronic device comprising:
a controller; and
a first system memory having instructions encoded therein, the instructions when executed by the controller cause said controller to operate by steps to:
    execute an EFI (extensible firmware interface) core program to load a kernel program into memory;

execute the kernel program to create an ISR (interrupt service routine);

reenter the EFI core program as a first thread supervised by the kernel;

executing the EFI core program to load a driver program; and executing the driver program on the first thread to invoke a service provided by the kernel to create and initialize a second thread supervised by the kernel and further to return control to the EFI core program, wherein the second thread is initiated to run in a SMM (system management mode) or a virtualized SMM (system management mode).

14. A method for loading and initializing a computer comprising:

executing an EFI (extensible firmware interface) core program to load a kernel program into memory;

executing the kernel program to create an ISR (interrupt service routine);

reentering the EFI core program as a first thread supervised by the kernel;

executing the EFI core program to load a driver program; and executing the driver program on the first thread to invoke a service provided by the kernel to create and initialize a second thread supervised by the kernel and further to return control to the EFI core program, wherein the second thread is initiated to run in a VM (virtual machine) distinct from the VM in which the first thread runs.

15. A non-transitory computer readable medium having stored thereon instructions for causing one or more processing units to execute a method, comprising:

executing an EFI (extensible firmware interface) core program to load a kernel program into memory;

executing the kernel program to create an ISR (interrupt service routine);

reentering the EFI core program as a first thread supervised by the kernel;

executing the EFI core program to load a driver program; and executing the driver program on the first thread to invoke a service provided by the kernel to create and initialize a second thread supervised by the kernel and further to return control to the EFI core program, wherein the second thread is initiated to run in a VM (virtual machine) distinct from the VM in which the first thread runs.

16. An electronic device comprising:

a controller; and a first system memory having instructions encoded therein, the instructions when executed by the controller cause said controller to operate by steps to:

execute an EFI (extensible firmware interface) core program to load a kernel program into memory;

execute the kernel program to create an ISR (interrupt service routine);

reenter the EFI core program as a first thread supervised by the kernel;

executing the EFI core program to load a driver program; and executing the driver program on the first thread to invoke a service provided by the kernel to create and initialize a second thread supervised by the kernel and further to return control to the EFI core program, wherein the second thread is initiated to run in a VM (virtual machine) distinct from the VM in which the first thread runs.

* * * * *